(12) United States Patent
Sohum et al.

(10) Patent No.: US 11,126,416 B2
(45) Date of Patent: Sep. 21, 2021

(54) METHOD AND SYSTEM FOR APPLICATION INSTALLATION AND INTERACTION DURING A PODCAST

(71) Applicant: Affle (India) Limited, Mumbai (IN)

(72) Inventors: Anuj Khanna Sohum, Singapore (SG); Charles Yong Jien Foong, Singapore (SG); Madhusudana Ramakrishna, Singapore (SG)

(73) Assignee: Affle (India) Limited, Mumbai (IN)

( * ) Notice: Subject to any disclaimer, the term of this patent is extended or adjusted under 35 U.S.C. 154(b) by 84 days.

(21) Appl. No.: 16/653,896

(22) Filed: Oct. 15, 2019

(65) Prior Publication Data
US 2020/0117435 A1 Apr. 16, 2020

(30) Foreign Application Priority Data
Oct. 15, 2018 (IN) .............................. 201821039073

(51) Int. Cl.
G06F 15/16 (2006.01)
G06F 8/61 (2018.01)
G06Q 30/02 (2012.01)
H04L 29/08 (2006.01)
G06F 3/01 (2006.01)

(52) U.S. Cl.
CPC .............. *G06F 8/61* (2013.01); *G06F 3/017* (2013.01); *G06Q 30/0277* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 10,680,995 B1* | 6/2020 | Hinkle | ................. | H04L 12/1813 |
| 2013/0232430 A1* | 9/2013 | Reitan | ................... | G09G 3/003 |
| | | | | 715/765 |
| 2016/0292736 A1* | 10/2016 | Yruski | ................... | H04L 67/02 |
| 2017/0046429 A1* | 2/2017 | Barrand | ................ | G06F 16/951 |
| 2017/0164030 A1* | 6/2017 | Navar | ................... | G06Q 30/02 |
| 2017/0201779 A1* | 7/2017 | Publicover | ......... | H04N 21/2668 |

* cited by examiner

*Primary Examiner* — Phyllis A Book
(74) *Attorney, Agent, or Firm* — Kolisch Hartwell, P.C.

(57) ABSTRACT

The present disclosure provides a method and system to perform installation of one or more applications based on the interaction of a user with a podcast. The method includes a first step to insert one or more advertisements during the broadcasting of the podcast. In addition, the method includes another step to detect mode of listening of the podcast by the user. Further, the method includes yet another step to determine one or more gestures. Furthermore, the method includes yet another step to receive one or more gesture inputs from the user. Moreover, the method includes yet another step to perform one or more actions at the application installation system.

20 Claims, 3 Drawing Sheets

METHOD AND SYSTEM FOR APPLICATION INSTALLATION AND INTERACTION DURING A PODCAST

TECHNICAL FIELD

The present disclosure relates to the field of podcast and, in particular, relates to a method and system for application installation and interaction during a podcast.

INTRODUCTION

Podcasts are becoming popular for content distribution over the internet.

Podcasts are audio or video files which are made in episodic series. The podcasts are prepared for downloading and listening purpose by a user on his media device. Generally, audio and visual advertisements are inserted into the podcasts by podcast provider websites or applications. The user takes the media device in order to interact with the advertisement displayed or played during the podcast on the media device. The user performs touch on the display screen of the media device in order to download or interact with the advertisement. In an example, a user may get redirected to an online store for downloading an application displayed in an advertisement during a podcast.

SUMMARY

In a first example, a computer-implemented method is provided. The computer-implemented method is configured to perform installation of one or more applications based on interaction of a user with a podcast. The method includes a first step to insert one or more advertisements during the broadcasting of the podcast at an application installation system. In addition, the method includes another step to detect mode of listening of the podcast by the user at the application installation system. Further, the method includes yet another step to determine one or more gestures at the application installation system. Furthermore, the method includes yet another step to receive one or more gesture inputs from the user at the application installation system. Moreover, the method includes yet another step to perform one or more actions at the application installation system. Also, the one or more advertisements are inserted to install the one or more applications in a computing device associated with the user. The one or more advertisements are inserted in real-time. Also, the detection of the mode of listening of the podcast by the user is performed in real-time. The detection of the mode of listening of the podcast is performed based on one or more hardware-run algorithms. Also, the one or more gestures are determined based on the detection of the mode of listening of the podcast by the user. The determination of the one or more gestures is performed to provide the one or more gestures to the user in real-time. The one or more gestures are provided to the user to perform one or more actions associated with the one or more applications. Also, the one or more gesture inputs are received based on the one or more gestures provided to the user. The one or more gesture inputs are received from the user in real-time. Also, the one or more actions are performed based on the one or more gestures provided to the user and the one or more gesture inputs received from the user in real-time.

In an embodiment of the present disclosure, each of the one or more applications is associated with a category. In addition, the category includes games, music and audio, tools, personalization, productivity, shopping, finance, communication, and photography, news and magazines. Further, the category comprising social, sports, medical, maps and navigation, art and design, beauty, events, weather, dating, parenting, comics, business, education, lifestyle, entertainment, utility, travel, book, health and fitness, and food and drink.

In an embodiment of the present disclosure, the one or more applications include at least one of native applications, hybrid applications and web-based applications.

In an embodiment of the present disclosure, the mode of listening of the podcast includes at least one of the computing device or an audio device. In addition, the computing device includes at least one of a fixed computing device or a portable computing device. Further, the audio device comprising at least one of headphones, headsets, earphones, speaker and microphone.

In an embodiment of the present disclosure, the one or more hardware-run algorithms include at least one of machine learning algorithms, artificial intelligence algorithms, neural network algorithms, and deep learning algorithms.

In an embodiment of the present disclosure, the one or more gestures include shaking of head, nodding of head, rotation of the head, voice commands, speaking a sentence, and solving a query using voice commands.

In an embodiment of the present disclosure, the one or more actions include at least one of installing the one or more applications in the computing device associated with the user, uninstalling the one or more applications from the computing device associated with the user, or not installing the one or more applications in the computing device associated with the user.

In an embodiment of the present disclosure, the application installation system sets a timer for the user to provide the one or more gesture inputs to the application installation system. In addition, the user is bound to provide the one or more gesture inputs to the application installation system before completion of pre-defined time of the timer.

In an embodiment of the present disclosure, the application installation system maps the one or more gesture inputs received from the user with the one or more gestures determined by the application installation system. In addition, the mapping is done to perform the one or more actions.

In an embodiment of the present disclosure, the application installation system installs the one or more applications in the computing device associated with the user. In addition, the one or more applications are installed after successful mapping of the one or more gesture inputs received from the user with the one or more gestures determined by the application installation system.

In a second example, a computer system is provided. The computer system includes one or more processors and a memory. The memory is coupled to the one or more processors. The memory stores instructions. The instructions are executed by the one or more processors. The execution of instructions causes the one or more processors to perform a method perform installation of one or more applications based on interaction of a user with a podcast. The method includes a first step to insert one or more advertisements during the broadcasting of the podcast at an application installation system. In addition, the method includes another step to detect mode of listening of the podcast by the user at the application installation system. Further, the method includes yet another step to determine one or more gestures at the application installation system. Furthermore, the method includes yet another step to receive one or more gesture inputs from the user at the application installation system. Moreover, the method includes yet another step to perform one or more actions at the application installation system. Also, the one or more advertisements are inserted to install the one or more applications in a computing device associated with the user. The one or more advertisements are inserted in real-time. Also, the detection of the mode of listening of the podcast by the user is performed in real-time. The detection of the mode of listening of the podcast is performed based on one or more hardware-run algorithms. Also, the one or more gestures are determined based on the detection of the mode of listening of the podcast by the user. The determination of the one or more gestures is performed to provide the one or more gestures to the user in real-time. The one or more gestures are provided to the user to perform one or more actions associated with the one or more applications. Also, the one or more gesture inputs are received based on the one or more gestures provided to the user. The one or more gesture inputs are received from the user in real-time. Also, the one or more actions are performed based on the one or more gestures provided to the user and the one or more gesture inputs received from the user in real-time.

In a third example, a non-transitory computer-readable storage medium is provided. The computer executable instructions that, when executed by at least one processor, performs a method. The method is configured perform installation of one or more applications based on interaction of a user with a podcast. The method includes a first step to insert one or more advertisements during the broadcasting of the podcast at an application installation system. In addition, the method includes another step to detect mode of listening of the podcast by the user at the application installation system. Further, the method includes yet another step to determine one or more gestures at the application installation system. Furthermore, the method includes yet another step to receive one or more gesture inputs from the user at the application installation system. Moreover, the method includes yet another step to perform one or more actions at the application installation system. Also, the one or more advertisements are inserted to install the one or more applications in a computing device associated with the user. The one or more advertisements are inserted in real-time. Also, the detection of the mode of listening of the podcast by the user is performed in real-time. The detection of the mode of listening of the podcast is performed based on one or more hardware-run algorithms. Also, the one or more gestures are determined based on the detection of the mode of listening of the podcast by the user. The determination of the one or more gestures is performed to provide the one or more gestures to the user in real-time. The one or more gestures are provided to the user to perform one or more actions associated with the one or more applications. Also, the one or more gesture inputs are received based on the one or more gestures provided to the user. The one or more gesture inputs are received from the user in real-time. Also, the one or more actions are performed based on the one or more gestures provided to the user and the one or more gesture inputs received from the user in real-time.

BRIEF DESCRIPTION OF DRAWINGS

Figure 1:
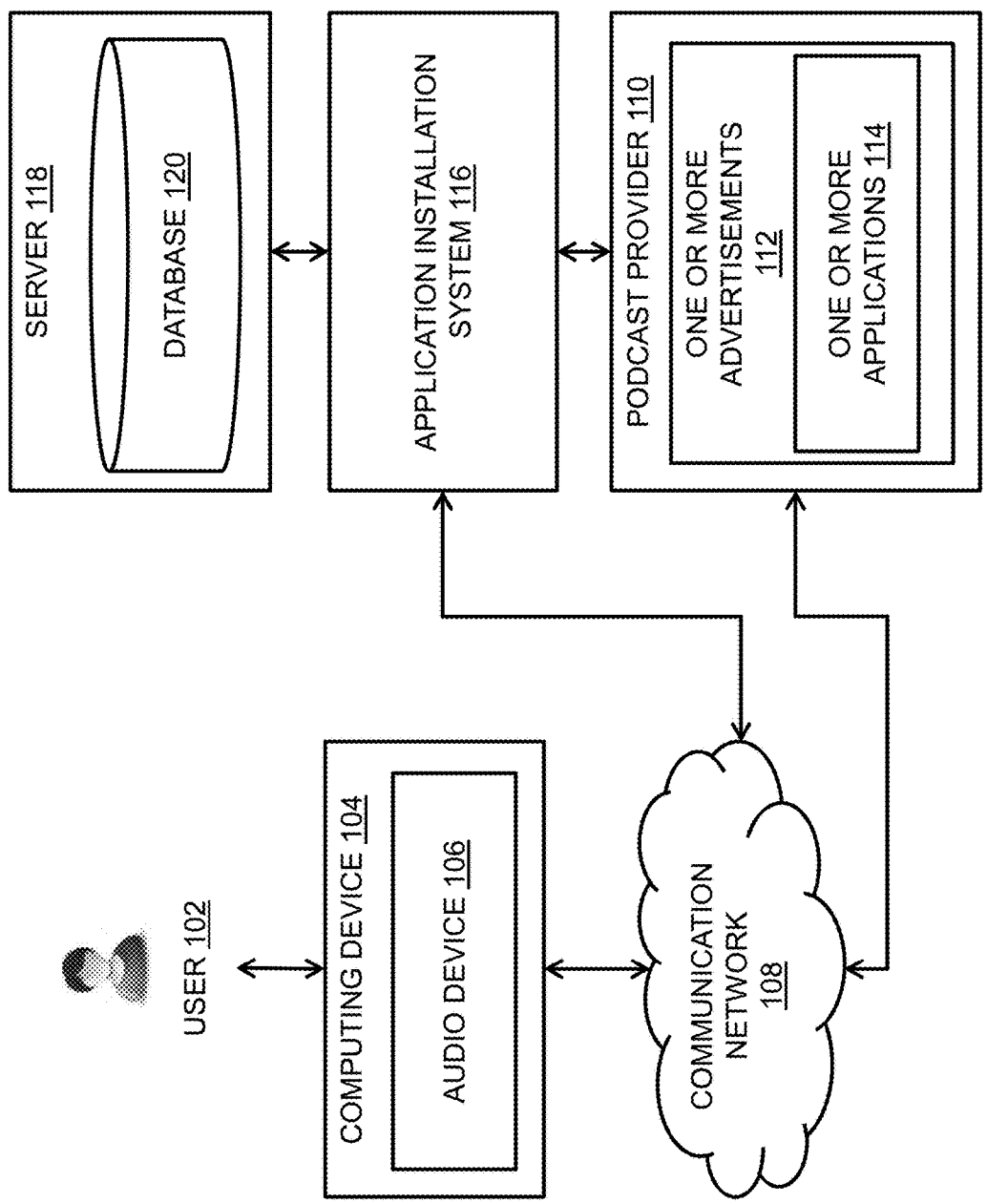
Figure 2:
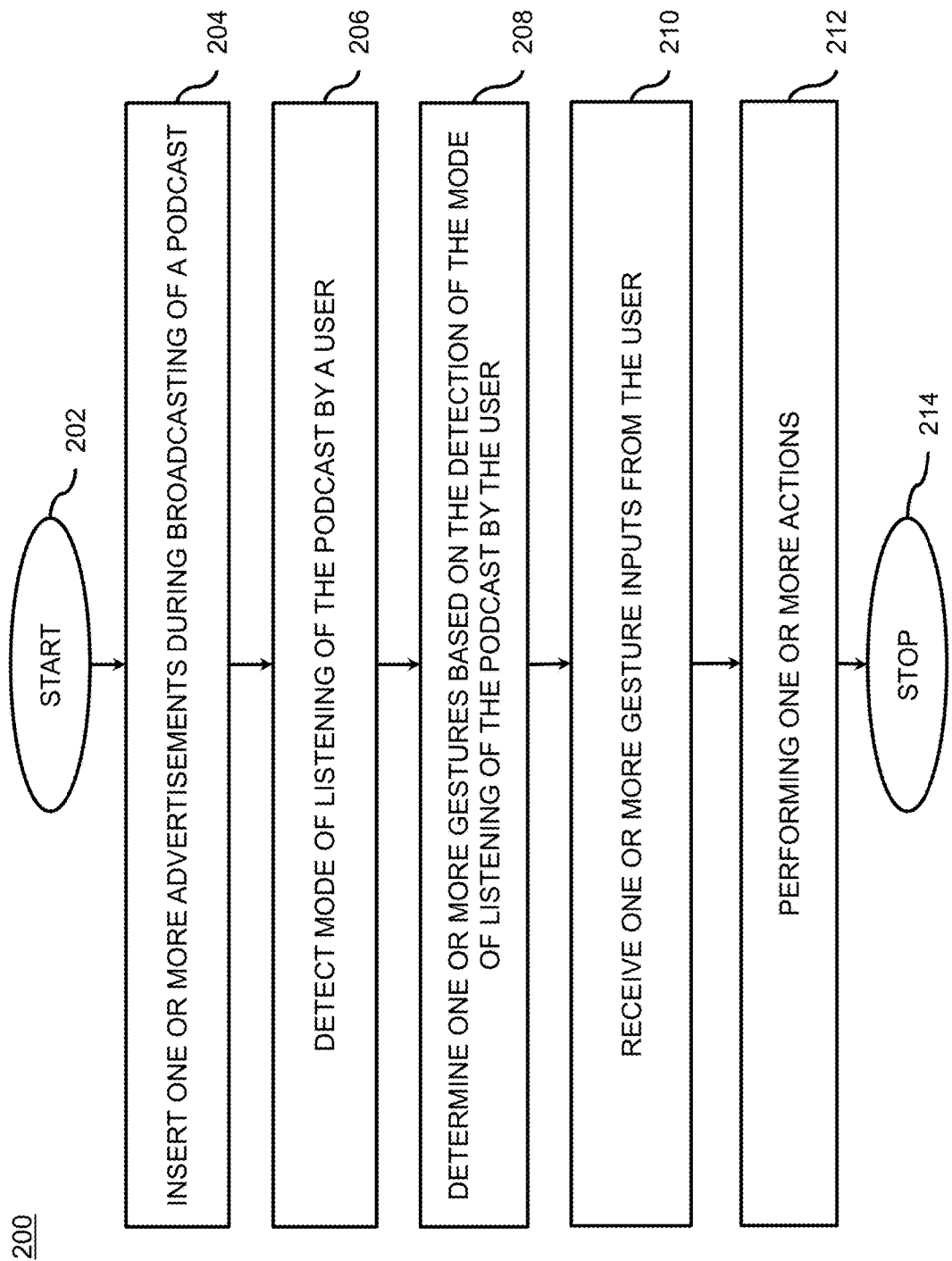
Figure 3:
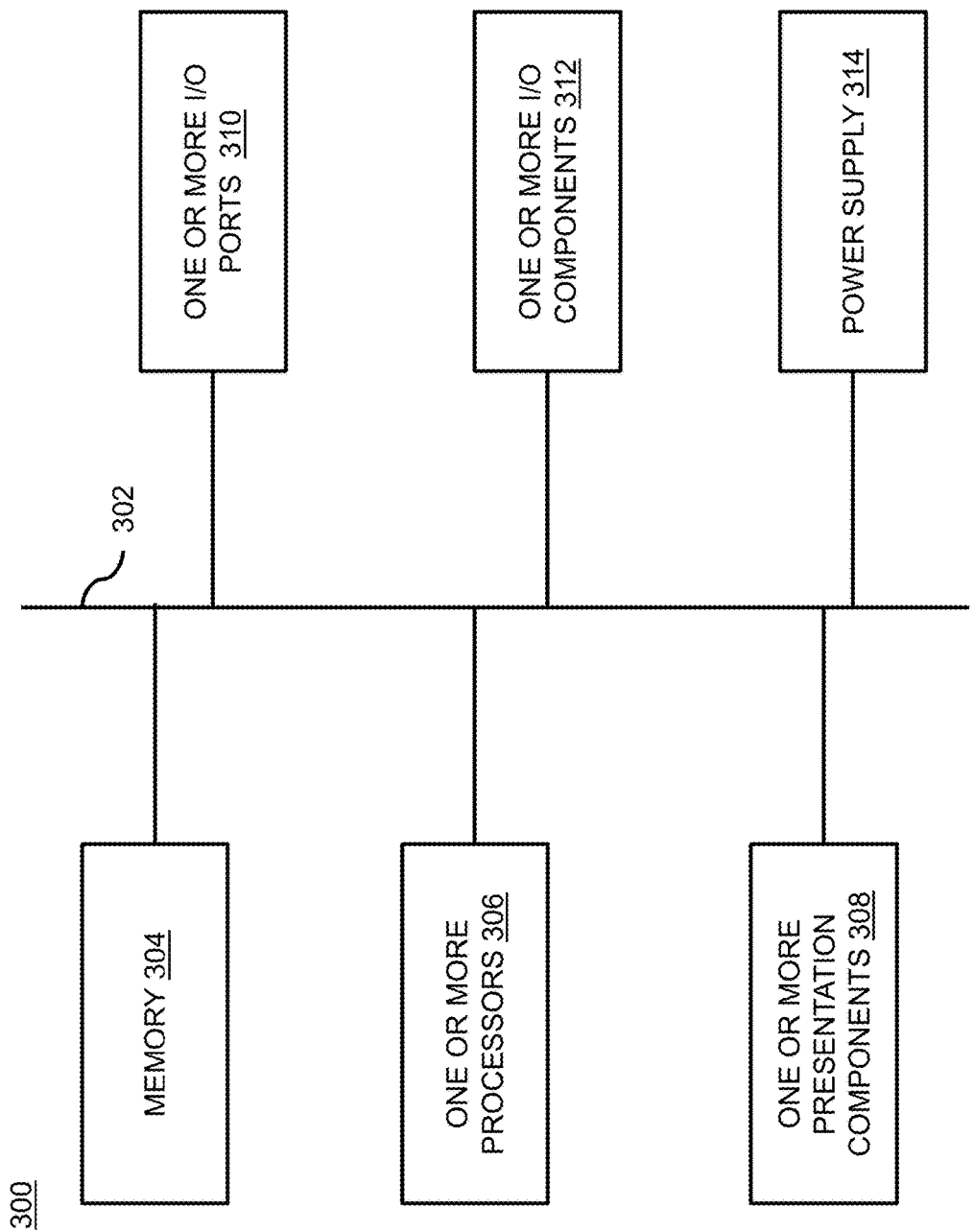

Having thus described the invention in general terms, references will now be made to the accompanying figures, wherein:

FIG. 1 illustrates an interactive computing environment for performing installation of applications based on interaction of a user with a podcast, in accordance with various embodiments of the present disclosure; and FIG. 2 illustrates a flowchart of a method for the installation of applications based on interaction of the user with the podcast, in accordance with various embodiments of the present disclosure; and FIG. 3 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates an interactive computing environment 100 for performing installation of applications based on interaction of a user 102 with a podcast, in accordance with various embodiment of the present disclosure. The interactive computing environment 100 shows a relationship between various entities involved in application installation during the podcast. In general, podcast is a digital audio or video file made available on Internet for downloading to a computer or mobile device. In addition, podcast is audio or video file which is created by an individual, a group or a company and the like. Further, podcast is created for purposes such as knowledge, advertisement, discussion and the like. Furthermore, podcast is prepared for downloading and listening purpose for users. Moreover, podcast is audio or video file which are made in episodic series.

The interactive computing environment 100 includes the user 102, a computing device 104, an audio device 106 and a communication network 108. The interactive computing environment 100 includes a podcast provider 110, one or more advertisements 112 and one or more applications 114. In addition, the interactive computing environment 100 includes an application installation system 116, a server 118 and a database 120. Further, each component of the interactive computing environment 100 interacts with each other to share data in real-time.

The interactive computing environment 100 includes the user 102. The user 102 is any person present at any location and wants to access media content. The user 102 is any legal person or natural person who accesses the media content. The media content includes but may not be limited to audio content, video content, podcast provider content and the like. In addition, the user 102 is an individual or person who accesses online media content on the computing device 104. In an embodiment of the present disclosure, the user 102 is an individual or person who is views and interacts with the one or more advertisements 112. The user 102 includes but may not be limited to natural person, legal entity and the individual. The user 102 is a person listening to the podcast on the computing device 104. In an embodiment of the present disclosure, the user 102 is moving from one location to another while listening to the podcast. In another embodiment of the present disclosure, the user 102 is driving while listening to the podcast.

The interactive computing environment 100 includes the computing device 104. The computing device 104 is associated with the user 102. The computing device 104 includes at least one of a portable computing device or a fixed computing device. The portable computing device includes but may not be limited to a smartphone, a laptop, a tablet, wearable watch, an iPhone, iPad, iPod and a personal digital assistant. In addition, the fixed computing device includes a smart television, a workstation, a desktop computer and the like. The user 102 accesses the computing device 104 in real-time. In an embodiment of the present disclosure, the computing device 104 is any type of device having an active internet connection. The computing device 104 is an internet-enabled device to allow the user 102 to access the podcast provider 110. In an embodiment of the present disclosure, the user 102 is an owner of the computing device 104. In another embodiment of the present disclosure, the user 102 is not the owner of the computing device 104. In addition, the computing device 104 is used to view an application installed on the computing device 104.

The user 102 listens to the podcast through the computing device 104. The computing device 104 is used to run the podcast. The podcast is broadcasted to the computing device 104 of the user 102. The computing device 104 is a media device used to listen to the podcast. In an embodiment of the present disclosure, the computing device 104 is used to store the podcast. In an embodiment of the present disclosure, the computing device 104 is used to view the one or more advertisements 112. In another embodiment of the present disclosure, the computing device 104 is used to listen to the one or more advertisements 112. In an embodiment of the present disclosure, the computing device 104 is moving from one location to another. In an example, location includes park, hotel, home, restaurant, any facility, college, university, office and the like.

The interactive computing environment 100 includes the audio device 106. The audio device 106 is connected with the computing device 104 of the user 102. The audio device 106 includes at least one of headphones, headsets, earphones, speaker and microphone. In addition, the audio device 106 includes one or more sensors for gesture detection. The one or more sensors include but may not be limited to accelerometer, gyroscope, barometer, proximity sensor, light sensor and magnetometer. In an embodiment of the present disclosure, the audio device 106 includes gyroscope and accelerometer for detection of gestures of human head of the user 102 in real-time. In an embodiment of the present disclosure, the audio device 106 is connected with the computing device 104 with a wired connection. In another embodiment of the present disclosure, the audio device 106 is connected with the computing device 104 with a wireless connection.

The interactive computing environment 100 includes the communication network 108. The communication network 108 denotes channels of communication (networks by which information flows). In an embodiment of the present disclosure, the communication network 108 includes LAN, MAN, WAN, and the like. In general, local area network, or LAN, cable or fiber, is used to connect computer equipment and other terminals distributed in the local area, such as in the university campus. In addition, Metropolitan Area Network or MAN is a high-speed network that is used to connect a small geographical area such as a LAN across the city. Further, Wide area networks, or any communication connections, including WAN, microwave radio link and satellite, are used to connect computers and other terminals to a larger geographic distance.

In an embodiment of the present disclosure, the communication network 108 may be any type of network that provides internet connectivity to the application installation system 116. In another embodiment of the present disclosure, the communication network 108 may be any type of network that provides internet connectivity to the computing device 104. In an embodiment of the present disclosure, the communication network 108 is a wireless mobile network. In another embodiment of the present disclosure, the communication network 108 is a wired network with finite bandwidth. In yet another embodiment of the present disclosure, the communication network 108 is a combination of the wireless and the wired network for optimum throughput of data transmission. In yet another embodiment of the present disclosure, the communication network 108 is an optical fiber high bandwidth network that enables high data rate with negligible connection drops. In yet another embodiment of the present disclosure, the communication network 108 provides medium to the computing device 104 to connect to the application installation system 116. In this scenario, the communication network 108 may be a global network of computing devices such as the Internet. The communication network 108 provides network connectivity to elements of the interactive computing environment 100. In addition, the communication network 108 allows the podcast provider 110 to broadcast the podcast on the computing device 104 of the user 102. Further, the communication network 108 allows the application owner to publish the one or more advertisements 112 on the computing device 104 of the user 102.

The interactive computing environment 100 includes the podcast provider 110. In an embodiment of the present disclosure, the podcast provider 110 includes mobile application, web application, and website. The podcast provider 110 is mobile application or website that displays or plays media content on the computing device 104 of the user 102. The application or the podcast provider 110 accessed by the user 102 shows content related to interest of the user 102. In an example, the user 102 is interested in listening motivational audio, audio book, self-help audio, knowledge audio and the like. In another example, the user 102 is interested in watching or listening to comedy videos, comic series, entertainment video and the like. The podcast provider 110 or applications are advertisement supporting applications which are stored on the computing device 104.

The podcast provider 110 allows individual, group or company to add the podcast on the podcast provider 110 by creating an account on the application or the podcast provider 110. The podcast is video file or audio file that is added by individual, group, or company from the account on the podcast provider 110. The podcast are displayed on the computing device 104 to the user 102 for viewing and listening purposes based on interest of the user 102. In an embodiment of the present disclosure, the podcast provider 110 provides time slots in the podcast to insert the one or more advertisement 108 in the podcast to be displayed or heard by the user 102. The podcast provider 110 advertises products, services or businesses to the user 102 to generate revenue. The podcast provider 110 displays the one or more advertisements 112 on the computing device 104 when the user 102 accesses the podcast provider 110.

The interactive computing environment 100 includes the one or more advertisements 112 to be viewed or listened by the user 102. In general, advertisement 108 is an audio, graphical or pictorial representation of information to promote a product, an event, service and the like. In general, the advertisement is a medium to promote a product, service, or an event. The one or more advertisements 112 include audio advertisements to be inserted within the podcast. In an embodiment of the present disclosure, the one or more advertisements 112 include text advertisements, video advertisements, graphic advertisements and the like. In an embodiment of the present disclosure, the one or more advertisements 112 are displayed or played in third party applications developed by application developers.

The interactive computing environment 100 includes the one or more applications 114. The one or more advertisements 112 are placed in the slots within the podcast to attract the user 102 to install the one or more applications 114. In general, application is software designed to perform a group of coordinated functions, tasks, or activities for the benefit of the user 102. The one or more applications 114 includes at least one of native applications, hybrid applications and web-based applications. In general, native applications are built for a specific operating system. In an example, native application developed for iOS operating system does not works on Android devices and vice-versa. In general, hybrid applications are a mixture of both native and mobile web apps. Further, hybrid applications have cross-platform compatibility but may still access phone's hardware. In general, web-based applications are web applications to render or deliver pages on web browsers running in mobile devices.

In an embodiment of the present disclosure, the one or more advertisements 112 are presented or played for attracting the user 102 to install the one or more applications 114. The one or more advertisements 112 are played or displayed for a specific period of time. The one or more applications 114 are associated with the one or more advertisements 112. The user 102 is re-directed to a website or application or application store associated with the one or more advertisements 112. In an embodiment of the present disclosure, the one or more advertisements 112 are provided to the podcast provider 110 by an application owner who wants to increase number of installs of their product, service or application through the podcast provider 110. The podcast provider 110 gets paid if the user 102 installs or downloads the one or more applications 114 through the one or more advertisements 112. In an embodiment of the present disclosure, number of users who view or listen to the one or more advertisements 112 through the podcast provider 110 generates more revenue for the podcast provider 110.

The interactive computing environment 100 includes the application installation system 116. The application installation system 116 performs a method to perform installation of the one or more applications 114 based on interaction of the user 102 with the podcast.

The application installation system 116 inserts the one or more advertisements 112 during broadcasting of the podcast. In an embodiment of the present disclosure, the one or more advertisements 112 are inserted dynamically in real time during online viewing or listening of the podcast by the user 102. In another embodiment of the present disclosure, the one or more advertisements 112 are inserted during uploading of the podcast by the individual, the group and the company. In addition, the one or more advertisements 112 are inserted in time slots provided by the podcast provider 110. In another embodiment of the present disclosure, the one or more advertisements 112 are inserted in the time slot by the individual, the group or the company that created the podcast. The podcast provider 110 provides revenue to podcast creator to add the one or more advertisements 112 in the podcast.

The application owner is the advertiser that wants to advertise their product, applications or services and the like. The application owner or advertiser approaches the podcast provider 110 and provides the one or more advertisements 112 to be displayed or played on the computing device 104 of the user 102. In an embodiment of the present disclosure, the application owner or advertiser pays the podcast provider 110 based on number of users being redirected or downloading or installing the one or more applications 114, products or services provided by the application owner or advertiser. The application owner purchases the time slots from the podcast provider 110. The advertiser provides the one or more advertisements 112 to advertisement network and information associated with advertising campaigns. The advertisement network enables displaying and playing of the one or more advertisements 112 during broadcasting of the podcast on behalf of the advertiser. In general, advertisement network is an entity that connects the advertiser to websites and mobile applications that are willing to serve advertisements. In an embodiment of the present disclosure, the advertisement network may be the podcast provider 110.

The one or more advertisements 112 are inserted to install the one or more applications 114. In an embodiment of the present disclosure, the one or more applications 114 are installed on the computing device 104 of the user 102. The application installation system 116 inserts the one or more advertisements 112 in real-time. In an embodiment of the present disclosure, the application installation system 116 provides installation method to the user 102 to trigger installation of the one or more applications 114 on the computing device 104. In another embodiment of the present disclosure, the application installation system 116 provides interaction methods to the user 102 to install and launch the one or more applications 114 on the computing device 104. In an embodiment of the present disclosure, the application installation system 116 measures number of users who listens to the one or more advertisement 108 during broadcasting of the podcast. In another embodiment of the present disclosure, the application installation system 116 measures number of users who downloaded the one or more applications 114 displayed or listened in the one or more advertisements 112.

In addition, each application of the one or more applications 114 is associated with a category. Further, the category includes games, music and audio, tools, personalization, productivity, shopping, finance, communication, and photography, news and magazines, wherein the category comprising social, sports, medical, maps and navigation, art and design, beauty, events, weather, dating, parenting, comics, business, education, lifestyle, entertainment, utility, travel, book, health and fitness, and food and drink.

The application installation system 116 detects mode of listening of the podcast by the user 102. The application installation system 116 detects the mode of listening of the podcast by the user 102 in real-time. The detection of the mode of listening of the podcast is performed based on one or more hardware-run algorithms. The mode of listening of the podcast includes at least one of a computing device 104 or the audio device 106. The computing device 104 includes at least one of a fixed computing device or a portable computing device.

In an embodiment of the present disclosure, the application installation system 116 detects the mode of listening of the podcast as the computing device 104. The user 102 utilizes the computing device 104 to listen to the podcast. In an embodiment of the present disclosure, the user 102 listens to the one or more advertisements 112 broadcasted during the podcast using the computing device 104. In an example, the user 102 listens to the one or more advertisements 112 and the podcast through speaker of the computing device 104.

In another embodiment of the present disclosure, the application installation system 116 detects the mode of listening of the podcast as the audio device 106. The audio device 106 includes at least one of headphones, headsets, earphones, speaker, microphone and the like. The audio device 106 includes one or more sensors to detect gestures. The one or more sensors include but may not be limited to accelerometer, gyroscope, barometer, proximity sensor, light sensor and magnetometer. The application installation system 116 detects the mode of listening of the podcast by the user 102 with facilitation of the one or more hardware-run algorithms. The one or more hardware-run algorithms include at least one of machine learning algorithms, artificial intelligence algorithms, neural network algorithms, deep learning algorithms and the like.

In an example, the application installation system 116 detects using the one or more hardware-run algorithms whether the user 102 is listening to the podcast using speaker of smartphone or speaker of bluetooth of car. In another example, the application installation system 116 detects using the one or more hardware-run algorithms whether the user 102 is listening to the podcast using headphones or speaker of computer system.

The application installation system 116 determines one or more gestures to be provided to the user 102. In general, gesture is a form of non-verbal communication or non-vocal communication in which visible bodily actions communicate particular messages, either in place of, or in conjunction with, speech. In addition, gestures include movement of the hands, face, or other parts of the body. The application installation system 116 determines the one or more gestures based on the detection of the mode of listening of the podcast by the user 102. The one or more gestures include shaking of head, nodding of head, rotation of head, voice commands, speaking a sentence, and solving a query using voice commands. The one or more gestures are provided to the user 102 to perform one or more actions associated with the one or more applications 114.

In an example, the application installation system 116 determine gesture as shaking of head if the user 102 is listening to the podcast using the audio device 106 (say headphones or earphones that detects motion). In another example, the application installation system 116 determines gesture using voice command such as "SAY INSTALL TO INSTALL THE APPLICATION" if the user 102 is listening the podcast using speaker of Bluetooth connected with car of the user 102.

The one or more gestures are provided to the user 102 to perform one or more actions associated with the one or more applications 114. The one or more gestures are provided to the user 102 by the application installation system 116. Further, the application installation system 116 receives one or more gesture inputs from the user 102. The one or more gesture inputs are received by the user 102 in response to the one or more gestures provided by the application installation system 116 to the user 102. The one or more gesture inputs are received based on the one or more gestures provided to the user 102. The one or more gesture inputs are received from the user 102 in real-time.

In an example, the application installation system 116 provides the one or more gestures to the user 102 as "Shake your head from top to down to install an application XYZ for travel" and "Shake your head from right to left to install an application ABC for food". The application installation system 116 provides the one or more gestures to the user 102. Now suppose the user 102 moves head from right to left to install the application ABC for food. The user 102 provides the gesture input in response to the one or more gestures provided to the user 102. Further, the application installation system 116 installs the application ABC for food in the computing device 104 associated with the user 102.

In an example, the one or more gesture inputs include but may not be limited to voice commands, shaking of head, nodding of head, and rotation of head. In addition, the one or more gesture inputs include but may not be limited to speaking a sentence, and solving a query using voice commands.

In an embodiment of the present disclosure, the application installation system 116 integrates with the audio device 106 connected with the computing device 104. In an embodiment of the present disclosure, the computing device 104 is connected with the audio device 106 using wired connection. In an example, the computing device 104 is connected with the audio device 106 using 3.5 mm headphone jack. In general, 3.5 mm headphone jack is a small round connector for accepting the pin-shaped plug from a standard pair of music headphones. In another embodiment of the present disclosure, the computing device 104 is connected with the audio device 106 using wireless connection. In an example, the computing device 104 is connected with the audio device 106 using Bluetooth or Wi-Fi connection. The integration of the application installation system 116 with the audio device 106 is performed in order to provide the one or more gestures to the user 102. In an embodiment of the present disclosure, integration with the audio device 106 is done in order to receive the one or more gesture inputs from the user 102.

In an embodiment of the present disclosure, the application installation system 116 receives data of the one or more gesture inputs from the audio device 106. The data of the one or more gesture inputs is received from the audio device 106 when the podcast is being played by the user 102 on the computing device 104. The data of the one or more gesture inputs is received from the audio device 106 in real time.

In another embodiment of the present disclosure, the application installation system 116 receives data of the one or more gesture inputs from microphone of the computing device 104. The data of the one or more gestures received from microphone include sample of the podcast being played on the audio device 106. In an embodiment of the present disclosure, the application installation system 116 analyzes the sample of the podcast in real time. In another embodiment of the present disclosure, the sample podcast may include an audio encoded data. The audio-encoded data may include the information to identify the one or more advertisements 112.

The application installation system 116 analyzes the sample of the podcast in order to identify the one or more advertisements 112 played during the broadcasting of the podcast. In an embodiment of the present disclosure, the analysis is performed using supervised machine learning algorithms. In another embodiment of the present disclosure, the analysis is performed using unsupervised machine learning algorithms. In yet another embodiment of the present disclosure, the analysis is performed using any other algorithm of the like.

The application installation system 116 performs mapping of the one or more gesture inputs received from the user 102 with the one or more gestures determined by the application installation system 116. The mapping is done for performing the one or more actions. In an embodiment of the present disclosure, the application installation system 116 performs mapping in order to detect the one or more gesture inputs received from the user 102 corresponding to the one or more gestures provided by the application installation system 116 to the user 102.

The application installation system 116 performs the one or more actions. The one or more actions are performed based on the one or more gestures provided to the user 102 and the one or more gesture inputs received from the user 102 in real-time. The one or more actions are performed based on outcome of mapping of the one or more gestures with the one or more gesture inputs. The one or more actions include at least one of installing the one or more applications 114 in the computing device 104 associated with the user 102, uninstalling the one or more applications 114 from the computing device 104 associated with the user 102, or not installing the one or more applications 114 in the computing device 104 associated with the user 102.

In an embodiment of the present disclosure, the application installation system 116 installs one or more applications 114 in the computing device 104 associated with the user 102. The one or more applications 114 are installed after successful mapping of the one or more gesture inputs received from the user 102 with the one or more gestures determined by the application installation system 116. The installation of one or more applications 114 is performed based on the mapping. The installation of one or more applications 114 is performed for which the one or more advertisements 112 has been seen or listened by the user 102 on the computing device 104.

In an example, the one or more advertisements 112 of the application owner is being played during the podcast on the audio device 106 connected with the computing device 104. The application installation system 116 detects the audio device 106 or the computing device 104 while playing the one or more advertisements 112. Further, the application installation system 116 determines and provides the one or more gestures to the user 102 to perform one or more actions. Furthermore, the application installation system 116 maps the one or more gesture inputs received from the user 102 with the one or more gestures provided by the application installation system 116 to perform one or more actions.

In another example, the application installation system 116 performs the installation of the one or more applications 114 when the user 102 speaks out particular word or phrase provided by the application installation system 116. Further, the particular word or phrase is pronounced by the user 102 to install the one or more applications 114 on the computing device 104.

In an embodiment of the present disclosure, the application installation system 116 receives data from accelerometer of the audio device 106. In an embodiment of the present disclosure, the application installation system 116 analyzes data from the accelerometer in order to receive the one or more gesture inputs from the user 102.

In an embodiment of the present disclosure, the application installation system 116 receives data from the gyroscope of the audio device 106. In an embodiment of the present disclosure, the application installation system 116 analyzes the data from the gyroscope in order to receive the one or more gesture inputs from the user 102.

In an embodiment, the application installation system 116 receives an interaction data from the audio device 106 associated with the computing device 104 of the user 102. The interaction data is received from the audio device 106 that includes information from the one or more sensors (say accelerometer, gyroscope and barometer) of the audio device 106. The application installation system 116 uses the one or more hardware-run algorithms to perform analysis of the interaction data in real-time. The analysis of the interaction data is performed in order to identify the user interaction data and detect the one or more gestures to be provided to the user 102.

In an embodiment of the present disclosure, the application installation system 116 may trigger one or more operations related to the one or more actions. The one or more operations include but may not be limited to launch of the application, launch of browser with URL to the application, and launch of browser with URL to the application store. In another embodiment of the present disclosure, the one or more operations include initiation the installation of the application.

In an embodiment of the present disclosure, the application installation system 116 receives information of number of users who have downloaded the one or more applications 114 during the broadcasting of the podcast on the computing device 104. In another embodiment of the present disclosure, the application installation system 116 generates report of the number of users who have downloaded the one or more applications 114 through the one or more advertisements 112 being listened to on the computing device 104. In an example, the application installation system 116 may generate report periodically in real time based on the requirement of the advertiser.

In an embodiment of the present disclosure, the application installation system 116 sets a timer for the user 102 to provide the one or more gesture inputs to the application installation system 116. In addition, the user 102 is bound to provide the one or more gesture inputs to the application installation system 116 before completion of pre-defined time of the timer. In an example, the application installation system 116 provides the gesture as "Say Install for installing the application" and waits for the user 102 to respond. The application installation system 116 waits for pre-defined time (say 20 seconds) for the user 102 to respond and continues to play the podcast if the user 102 does not responds within 20 seconds.

The interactive computing environment 100 includes the server 118. The server 118 stores one or more instructions to perform various operations of the application installation system 116. In an embodiment of the present disclosure, the server 118 is a cloud server which is built, hosted and delivered through a cloud computing platform. In general, cloud computing is a process of using remote network server which are hosted on the internet to store, manage, and process data. The use of cloud server helps the application installation system 116 to receive data from the computing device 104 using the Internet.

In addition, the server 118 is associated with the database 120. The database 120 is storage location of all data associated with the application installation system 116. In an embodiment of the present disclosure, the application installation system 116 stores the device data, the traffic data and the third party data in the database 120. In another embodiment of the present disclosure, the database 120 provides storage location to the interaction data.

FIG. 2 illustrates a flow chart 200 of a method for performing installation of the one or more applications 114 based on interaction of the user 102 with the podcast, in accordance with various embodiments of the present disclosure. It may be noted that to explain the process steps of flowchart 200, references will be made to the system elements of FIG. 1. It may also be noted that the flowchart 200 may have fewer or more number of steps.

The flowchart 200 initiates at step 202. Following step 202, at step 204, the application installation system 116 inserts the one or more advertisements 112 during the broadcasting of the podcast. The one or more advertisements 112 are inserted to install the one or more applications 114 in the computing device 104 associated with the user 102. The one or more advertisements 112 are inserted in real-time. At step 206, the application installation system 116 detects the mode of listening of the podcast by the user 102. The detection of the mode of listening of the podcast by the user 102 is performed in real-time. The detection of the mode of listening of the podcast is performed based on the one or more hardware-run algorithms. At step 208, the application installation system 116 determines the one or more gestures. The one or more gestures are determined based on the detection of the mode of listening of the podcast by the user 102. The determination of the one or more gestures is performed to provide the one or more gestures to the user 102 in real-time. The one or more gestures are provided to the user 102 to perform one or more actions associated with the one or more applications 114. At step 210, the application installation system 116 receives the one or more gesture inputs from the user 102. The one or more gesture inputs are received based on the one or more gestures provided to the user 102. The one or more gesture inputs are received from the user 102 in real-time. At step 212, the application installation system 116 performs the one or more actions. Also, the one or more actions are performed based on the one or more gestures provided to the user 102 and the one or more gesture inputs received from the user 102 in real-time. The flow chart 200 terminates at step 214.

FIG. 3 illustrates a block diagram of a computing device 300, in accordance with various embodiments of the present disclosure. The computing device 300 is a non-transitory computer readable storage medium. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the device 300 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes the one or more processors 306 that read data from various entities such as memory 304 or I/O components 312. The one or more presentation components 308 present data indications to the user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, gamepad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

We claim:

1. A computer-implemented method for performing installation of one or more applications based on interaction of a user with a podcast, the computer-implemented method comprising:
    inserting, at an application installation system with a processor, one or more advertisements during broadcasting of the podcast, wherein the one or more advertisements are inserted for installing the one or more applications in a computing device associated with the user, wherein the one or more advertisements are inserted in real-time;
    detecting, at the application installation system with the processor, mode of listening of the podcast by the user, wherein the detection of the mode of listening of the podcast by the user is performed in real-time, wherein the detection of the mode of listening of the podcast is performed based on one or more hardware-run algorithms;
    determining, at the application installation system with the processor, one or more gestures, wherein the one or more gestures are determined based on the detection of the mode of listening of the podcast by the user, wherein the determination of the one or more gestures is performed for providing the one or more gestures to the user in real-time, wherein the one or more gestures are provided to the user for performing one or more actions associated with the one or more applications;
    receiving, at the application installation system with the processor, one or more gesture inputs from the user, wherein the one or more gesture inputs are received based on the one or more gestures provided to the user, wherein the one or more gesture inputs are received from the user in real-time; and
    performing, at the application installation system with the processor, the one or more actions, wherein the one or more actions are performed based on the one or more gestures provided to the user and the one or more gesture inputs received from the user in real-time.

2. The computer-implemented method as recited in claim 1, wherein each of the one or more applications is associated with a category, wherein the category comprising games, music and audio, tools, personalization, productivity, shopping, finance, communication, and photography, news and magazines, wherein the category comprising social, sports, medical, maps and navigation, art and design, beauty, events, weather, dating, parenting, comics, business, education, lifestyle, entertainment, utility, travel, book, health and fitness, and food and drink.

3. The computer-implemented method as recited in claim 1, wherein the one or more applications comprising at least one of native applications, hybrid applications and web-based applications.

4. The computer-implemented method as recited in claim 1, wherein the mode of listening of the podcast comprising at least one of the computing device or an audio device, wherein the computing device comprising at least one of a fixed computing device or a portable computing device, wherein the audio device comprising at least one of headphones, headsets, earphones, speaker and microphone.

5. The computer-implemented method as recited in claim 1, wherein the one or more hardware-run algorithms comprising at least one of machine learning algorithms, artificial intelligence algorithms, neural network algorithms, and deep learning algorithms.

6. The computer-implemented method as recited in claim 1, wherein the one or more gestures comprising shaking of head, nodding of head, rotation of head, voice commands, speaking a sentence, and solving a query using voice commands.

7. The computer-implemented method as recited in claim 1, wherein the one or more actions comprising at least one of installing the one or more applications in the computing device associated with the user, uninstalling the one or more applications from the computing device associated with the user, or not installing the one or more applications in the computing device associated with the user.

8. The computer-implemented method as recited in claim 1, further comprising setting, at the application installation system with the processor, a timer for the user for providing the one or more gesture inputs to the application installation system, wherein the user is bound for providing the one or more gesture inputs to the application installation system before completion of pre-defined time of the timer.

9. The computer-implemented method as recited in claim 1, further comprising mapping, at the application installation system with the processor, the one or more gesture inputs received from the user with the one or more gestures determined by the application installation system, wherein the mapping is done for performing the one or more actions.

10. The computer-implemented method as recited in claim 1, further comprising installing, at the application installation system with the processor, the one or more applications in the computing device associated with the user, wherein the one or more applications are installed after successful mapping of the one or more gesture inputs received from the user with the one or more gestures determined by the application installation system.

11. A computer system comprising:
    one or more processors; and
    a memory coupled to the one or more processors, the memory for storing instructions which, when executed by the one or more processors, cause the one or more processors to perform a method for performing installation of one or more applications based on interaction of a user with a podcast, the method comprising:
        inserting, at an application installation system, one or more advertisements during broadcasting of the podcast, wherein the one or more advertisements are inserted for installing the one or more applications in a computing device associated with the user, wherein the one or more advertisements are inserted in real-time;

detecting, at the application installation system, mode of listening of the podcast by the user, wherein the detection of the mode of listening of the podcast by the user is performed in real-time, wherein the detection of the mode of listening of the podcast is performed based on one or more hardware-run algorithms;

determining, at the application installation system, one or more gestures, wherein the one or more gestures are determined based on the detection of the mode of listening of the podcast by the user, wherein the determination of the one or more gestures is performed for providing the one or more gestures to the user in real-time, wherein the one or more gestures are provided to the user for performing one or more actions associated with the one or more applications;

receiving, at the application installation system, one or more gesture inputs from the user, wherein the one or more gesture inputs are received based on the one or more gestures provided to the user, wherein the one or more gesture inputs are received from the user in real-time; and performing, at the application installation system, the one or more actions, wherein the one or more actions are performed based on the one or more gestures provided to the user and the one or more gesture inputs received from the user in real-time.

12. The computer system as recited in claim 11, wherein each of the one or more applications is associated with a category, wherein the category comprising games, music and audio, tools, personalization, productivity, shopping, finance, communication, and photography, news and magazines, wherein the category comprising social, sports, medical, maps and navigation, art and design, beauty, events, weather, dating, parenting, comics, business, education, lifestyle, entertainment, utility, travel, book, health and fitness, and food and drink.

13. The computer system as recited in claim 11, wherein the one or more applications comprising at least one of native applications, hybrid applications and web-based applications.

14. The computer system as recited in claim 11, wherein the mode of listening of the podcast comprising at least one of the computing device or an audio device, wherein the computing device comprising at least one of a fixed computing device or a portable computing device, wherein the audio device comprising at least one of headphones, headsets, earphones, speaker and microphone.

15. The computer system as recited in claim 11, wherein the one or more hardware-run algorithms comprising at least one of machine learning algorithms, artificial intelligence algorithms, neural network algorithms, and deep learning algorithms.

16. The computer system as recited in claim 11, wherein the one or more gestures comprising shaking of head, nodding of head, rotation of head, voice commands, speaking a sentence, and solving a query using voice commands.

17. The computer system as recited in claim 11, wherein the one or more actions comprising at least one of installing the one or more applications in the computing device associated with the user, uninstalling the one or more applications from the computing device associated with the user, or not installing the one or more applications in the computing device associated with the user.

18. The computer system as recited in claim 11, further comprising setting, at the application installation system, a timer for the user for providing the one or more gesture inputs to the application installation system, wherein the user is bound for providing the one or more gesture inputs to the application installation system before completion of pre-defined time of the timer.

19. The computer system as recited in claim 1, further comprising mapping, at the application installation system, the one or more gesture inputs received from the user with the one or more gestures determined by the application installation system, wherein the mapping is done for performing the one or more actions.

20. A non-transitory computer-readable storage medium encoding computer executable instructions that, when executed by at least one processor, performs a method for performing installation of one or more applications based on interaction of a user with a podcast, the method comprising:

inserting, at a computing device, one or more advertisements during broadcasting of the podcast, wherein the one or more advertisements are inserted for installing the one or more applications in a computing device associated with the user, wherein the one or more advertisements are inserted in real-time;

detecting, at the computing device, mode of listening of the podcast by the user, wherein the detection of the mode of listening of the podcast by the user is performed in real-time, wherein the detection of the mode of listening of the podcast is performed based on one or more hardware-run algorithms;

determining, at the computing device, one or more gestures, wherein the one or more gestures are determined based on the detection of the mode of listening of the podcast by the user, wherein the determination of the one or more gestures is performed for providing the one or more gestures to the user in real-time, wherein the one or more gestures are provided to the user for performing one or more actions associated with the one or more applications;

receiving, at the computing device, one or more gesture inputs from the user, wherein the one or more gesture inputs are received based on the one or more gestures provided to the user, wherein the one or more gesture inputs are received from the user in real-time; and performing, at the computing device, the one or more actions, wherein the one or more actions are performed based on the one or more gestures provided to the user and the one or more gesture inputs received from the user in real-time.

* * * * *